UNITED STATES PATENT OFFICE.

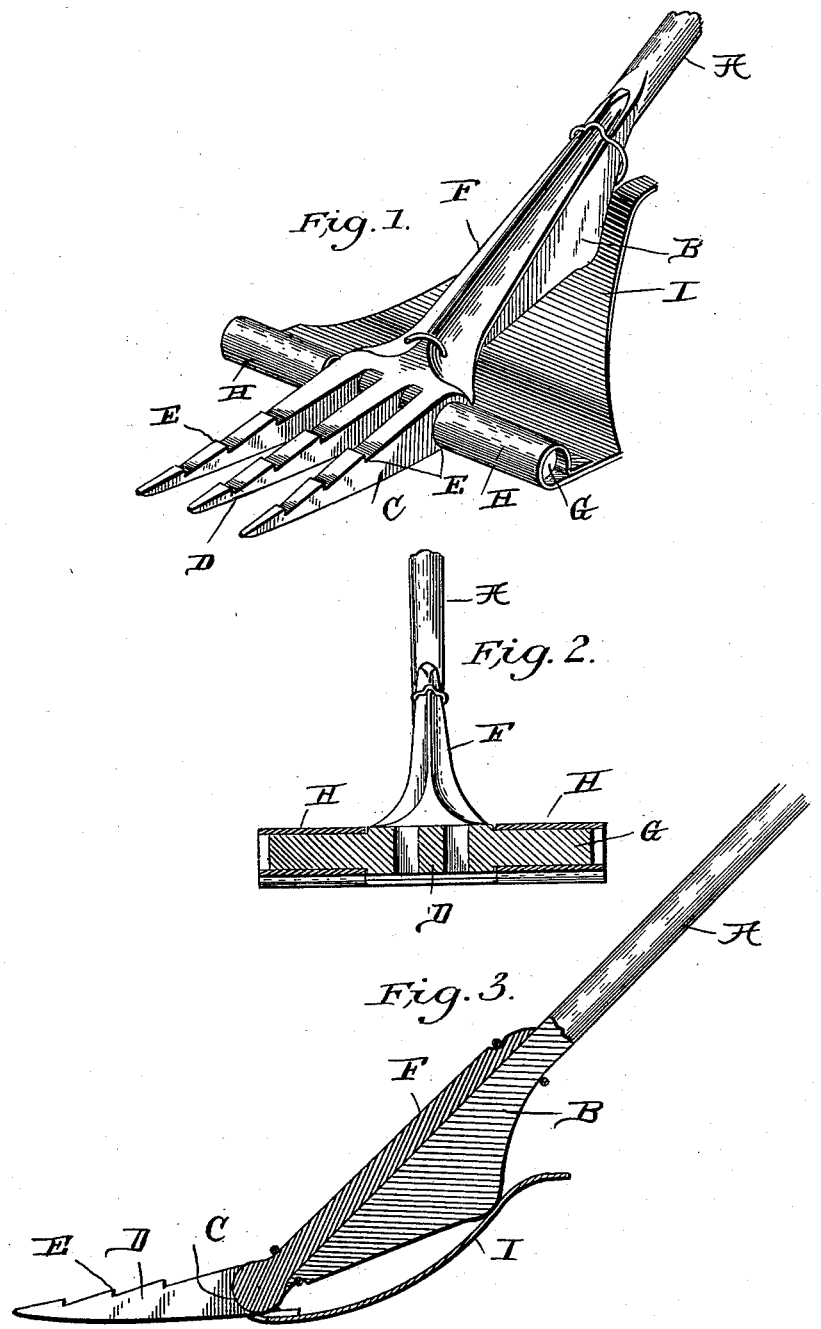

GEORGE E. DUTTON, OF WHITE CITY, FLORIDA.

GRUBBING-FORK.

SPECIFICATION forming part of Letters Patent No. 596,579, dated January 4, 1898.

Application filed July 28, 1896. Serial No. 600,842. (No model.)

*To all whom it may concern:*

Be it known that I, GEORGE E. DUTTON, a citizen of the United States, residing at White City, in the county of Brevard and State of Florida, have invented certain new and useful Improvements in Grubbing-Forks; and I do hereby declare the following to be a full, clear, and exact description of the invention, such as will enable others skilled in the art to which it appertains to make and use the same.

This invention relates to certain new and useful improvements in grubbing-forks; and it has for its objects, among others, to provide an improved device by which the roots of the palmetto and other plants and shrubs can be more easily and effectually removed. In some parts of the country—in Florida especially—the saw-palmetto grows very dense, making such land very hard to clear. This has generally been done by the grubbing-hoe or mattock; but as the body of the palmetto lies along on the top of the ground, varying in length all the way up to, say, twelve feet, and in size as large as six inches in diameter, and the roots are all on the under side, and sometimes with as many as a hundred small roots to the one root and varying in size up to three-fourths of an inch in diameter and all the way from six inches to nine feet long, and when pulled resemble a thousand-legged worm, it will be readily understood how difficult it is to uproot these roots. These roots contain strong tannic acid and when left in the ground, as they are by ordinary methods of grubbing, cause the ground to remain sour and unfitted for the propagation of seed for several years. By my improvement all or nearly all of these roots can be easily pulled and much quicker than by the use of the ordinary grubbing-hoe. The hardest pull is to start the palmetto and move it the first few inches. After that it comes easily until it is out.

I form my grubber with prongs that are toothed or notched to hold the palmetto in place and prevent the grubber or fork from slipping out. The fork is provided with an axle where the lever turns in bearings on the fulcrum. This fulcrum is elongated on the base in the form of a curve, which elevates the fork and aids materially in the starting of the roots.

Other objects and advantages of the invention will hereinafter appear, and the novel features thereof will be specifically defined by the appended claims.

The invention is clearly illustrated in the accompanying drawings, which, with the letters of reference marked thereon, form a part of this specification, and in which—

Figure 1 is a perspective view of my improved grubber lever-fork. Fig. 2 is a section through the axis on which the fulcrum turns. Fig. 3 is a central vertical longitudinal section.

Like letters of reference indicate like parts throughout the several views.

Referring now to the details of the drawings by letter, A designates the handle portion, preferably of wood and having at its lower end, upon its under side, the projection B, against which the free end of the fulcrum bears.

C is the fork. It is formed, by preference, with three prongs D, the upper faces of which are toothed or notched, as shown at E, to hold the shrub and prevent its slipping. The shank F of this fork may be secured to the handle in any suitable manner.

Projecting from opposite sides of the body portion of the fork are the round portions or axles G, upon which are sleeved the tubular portions H of the fulcrum I, which is formed upon a curve, as shown, and the tubular portions formed integral therewith.

In use the handle portion is raised substantially vertically. Then place one foot on the base and push the fork under and touching the palmetto. The notches on the top of the prongs will prevent slipping. Then pull down on the lever. The lever-fulcrum is so close (almost under the palmetto) that the leverage is very powerful. By the time the projecting base of the lever strikes the extended point of the fulcrum the roots will be well started, and the necessary throw of the fulcrum elevates the fork in the air and the roots are out.

Modifications in the details of construction may be resorted to without departing from the spirit of the invention or sacrificing any of its advantages.

What is claimed as new is—

1. As an improved article of manufacture, a grubbing-fork having prongs whose upper faces are notched and provided upon opposite sides of its body portion with axles, and a curved fulcrum having tubular portions integral therewith and mounted upon said axles, substantially as shown and described.

2. A grubbing lever-fork having notched prongs and laterally-projecting portions combined with a handle having upon its under side at its lower end a projection, and a curved fulcrum mounted on the projections of the fork and its free end adapted to bear against the projection of the handle, substantially as and for the purpose specified.

In testimony whereof I have signed this specification in the presence of two subscribing witnesses.

GEORGE E. DUTTON.

Witnesses:
 A. C. DITTMAR,
 B. H. MIDDLEBROOKS.